United States Patent
Feeney et al.

(12)

(10) Patent No.: US 6,491,595 B1
(45) Date of Patent: Dec. 10, 2002

(54) METHOD OF MANUFACTURING A SPORT BALL HAVING A SELF-CONTAINED INFLATION MECHANISM

(75) Inventors: Brian P. Feeney, East Windsor, CT (US); Joseph E. Stahl, Southampton, MA (US); Richard F. Terrazzano, Salem, NH (US); Eric K. Litscher, Hopkinton, MA (US); Andrew C. Harvey, Waltham, MA (US); Malcolm E. Taylor, Pepperell, MA (US); Peter M. de Bakker, Hudson, MA (US); Robert C. Sykes, Burlington, MA (US); Charles Keane, Hingham, MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 1 day.

(21) Appl. No.: 09/712,116

(22) Filed: Nov. 14, 2000

Related U.S. Application Data

(63) Continuation-in-part of application No. 09/594,980, filed on Jun. 15, 2000, now Pat. No. 6,409,618, which is a continuation-in-part of application No. 09/478,225, filed on Jan. 6, 2000, now Pat. No. 6,287,225.

(60) Provisional application No. 60/159,311, filed on Oct. 14, 1999.

(51) Int. Cl.$^7$ ............................................. A63B 37/00
(52) U.S. Cl. ...................................................... 473/593
(58) Field of Search ................................ 473/593, 570, 473/571, 610, 611; 446/220, 224; 417/478, 499, 480, 259; 36/29

(56) References Cited

U.S. PATENT DOCUMENTS

| | | | | |
|---|---|---|---|---|
| 602,294 A | * | 4/1898 | Arnold | 473/593 |
| 3,119,617 A | * | 1/1964 | Topper | 473/593 |
| 3,229,976 A | * | 1/1966 | Allen, Jr. | 473/570 |
| 4,595,200 A | * | 6/1986 | Shishido | 473/570 |
| 4,776,589 A | * | 10/1988 | Yang | 473/570 |
| 5,098,095 A | * | 3/1992 | Wiess | 473/593 |
| 5,238,244 A | * | 8/1993 | Cotter et al. | 473/593 |

* cited by examiner

Primary Examiner—Steven Wong

(57) ABSTRACT

A method of manufacturing a sport ball includes providing a fluid impervious bladder, providing apparatus for penetrating the bladder and including apparatus for receiving an object in sealing engagement, providing a plug dimensioned and configured to engage in sealing relationship the apparatus for receiving in sealing engagement, inserting the plug into the apparatus for receiving, inflating the bladder, and forming additional layers of material on the bladder that is part of a complete sport ball. Thereafter, the method includes providing a self-contained inflation mechanism dimensioned and configured to be disposed within the envelope of the sport ball and dimensioned and configured to engage the apparatus for receiving, removing the plug from the apparatus for receiving, and placing the inflation mechanism into the apparatus for receiving.

In some forms of the invention the step of forming additional layers includes adding reinforcing windings, molding a layer of rubber on the windings, and laminating composite panels onto the ball and setting the panels in a molding process.

10 Claims, 5 Drawing Sheets

METHOD OF MANUFACTURING A SPORT BALL HAVING A SELF-CONTAINED INFLATION MECHANISM

This application is a Continuation-In-Part of and claims the benefit of U.S. patent application Ser. No. 09/594,980, filed Jun. 15, 2000 now U.S. Pat. No. 6,409,618. That application is a Continuation-In-Part of and claims the benefit of U.S. patent application Ser. No. 09/478,225, filed Jan. 6, 2000 now U.S. Pat. No. 6,287,225, and further claims the benefit of U.S. Provisional Application No. 60/159,311, filed Oct. 14, 1999.

BACKGROUND OF THE INVENTION

The present invention relates to methods of manufacturing sport balls that contain mechanisms for inflating or adding pressure to such balls.

Conventional inflatable sport balls, such as basketballs, footballs, soccer balls, volleyballs and playground balls, are inflated through a traditional inflation valve using a separate inflation needle that is inserted into and through a self-sealing inflation valve. A separate pump, such as a traditional bicycle pump, is connected to the inflation needle and the ball is inflated using the pump. The inflation needle is then withdrawn from the inflation valve that self-seals to maintain the pressure. This system works fine until the sport ball needs inflation or a pressure increase and a needle and/or pump are not readily available.

The U.S. patent application Ser. No. 09/594,980, filed Jun. 15, 2000 and having the same assignee as this application, describes a sport ball that has a self-contained inflation mechanism, dimensioned and configured to be retained completely within the envelope of the ball except when the inflation mechanism is being used to inflate the ball. The object of that invention is to be able to inflate or add pressure to a sport ball without the need for separate inflation equipment such as a separate inflation needle and pump. Specifically, that invention relates to a sport ball, which has a self-contained pump device, which is operable from outside the ball and which pumps ambient air into the ball to achieve the desired pressure. More specifically, the pump device provides a chamber within the ball with means for admitting ambient air into the chamber and provides means for forcing that air from the chamber through one-way valve means into the interior volume of the ball. The pump device more specifically comprises a piston and cylinder arrangement with the piston operable from outside the ball.

The manufacturing process for molded volley balls, footballs, basketballs, soccer balls, rugby balls and the like requires molding processes with temperatures of approximately 300 degrees Fahrenheit and a pressure of approximately 100 psi within the ball. In conventional sport balls this does not present a problem. However, in the manufacture of sport balls having a self-contained pump these temperatures and pressures do create a problem. More particularly, the preferred internal pump construction utilizes plastic pump components that are likely to be damaged by this combination of pressure and temperature. The design of the pump is preferably based on the environmental conditions anticipated in normal use of the ball. While it would be possible to design the pump using materials that would withstand the temperatures and pressures encountered during the manufacturing process, such a rigorous design specification would substantially increase the costs of manufacture of the pump.

SUMMARY OF THE INVENTION

It is thus an object of the present invention to provide a method of manufacturing a sport ball having a self-contained pump for adding air to the interior of the ball, which does not require the pump to be manufactured to specifications which would tolerate the harsh temperature and pressure conditions that occur during the manufacturing process.

It is another object of the invention to provide a method of manufacturing a sport ball of this type which is simple and inexpensive to implement.

It has now been found that these and other objects of the invention may be achieved in a method of manufacturing a sport ball which includes providing a fluid impervious bladder, providing apparatus for penetrating the bladder that includes apparatus for receiving an object in sealing engagement, providing a plug dimensioned and configured to engage in sealing relationship the apparatus for receiving in sealing engagement, inserting the plug into the means for receiving, inflating the bladder, forming additional layers of material on the bladder that constitutes part of a complete sport ball, providing the plug with a self-contained inflation mechanism dimensioned and configured to be disposed within the envelope of the sport ball and dimensioned and configured to engage the means for receiving, removing the plug from the means for receiving, and placing the inflation mechanism into the means for receiving.

In some forms of the invention the step of forming additional layers includes adding reinforcing windings and may also include the step of forming additional layers including molding a layer of rubber on the windings as well as the step of laminating composite panels onto the ball and setting the panels in a molding process.

The invention also includes a method of manufacturing a sport ball which includes providing a flat piece of rubber, die-cutting two openings in a flat piece of rubber, forming the flat piece of rubber into a bladder having the geometric shape of a sport ball with openings disposed in generally opposed relationship, cementing a needle valve in one of the openings, cementing a boot in the other of the openings in the rubber, inserting a plug in the boot that is dimensioned and configured for sealing engagement with the boot, forming additional layers of material on the bladder, and replacing the plug with a self-contained inflation mechanism dimensioned and configured to be disposed within the envelope of the sport ball and dimensioned and configured to engage the boot.

DESCRIPTION OF THE PREFERRED EMBODIMENT

Figure 1:
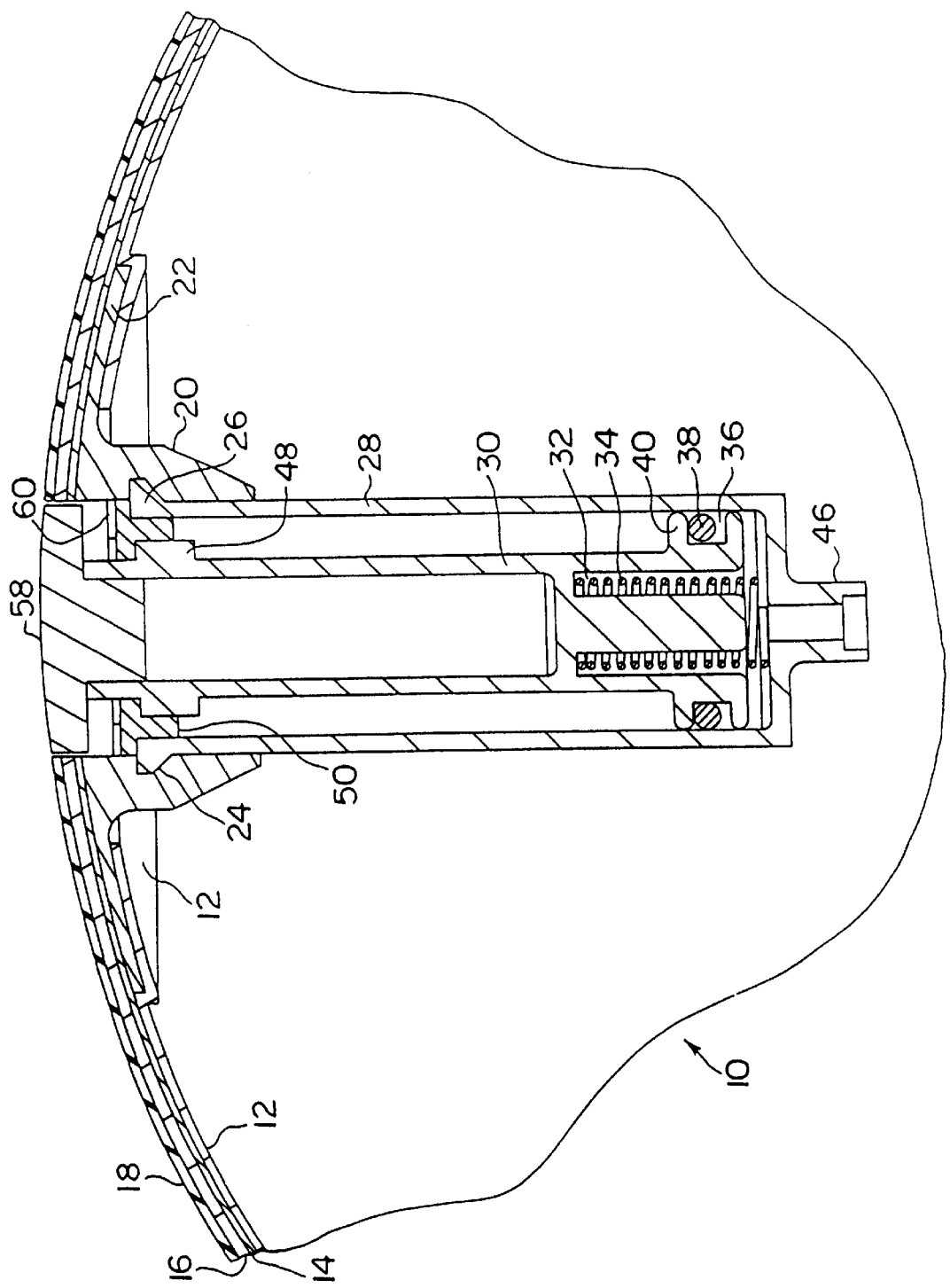
FIG. 1 is a cross-section view of a portion of a sport ball with a self-contained piston and cylinder arrangement operable from outside the ball for adding air pressure to the ball.

The invention relates to a method of manufacturing a sport ball having a pump mechanism that is disposed completely within the envelope of the sport ball except when the mechanism is being used to inflate the ball. The method of manufacture will best be understood by first considering the structure of the ball. Referring first to FIGS. 1 to 7 of the drawings, a portion of a sport ball 10 is illustrated incorporating one embodiment of an inflation pump. The ball 10 which is illustrated is a typical basketball construction comprising a carcass having a rubber bladder 12 for air retention, a layer 14 composed of layers of nylon or polyester yarn windings wrapped around the bladder 12 and an outer rubber layer 16. For a laminated ball, an additional outer layer 18 of leather or a synthetic comprises panels that are applied by adhesive and set by cold molding. The windings are randomly oriented and two or three layers thick. The windings form a layer which cannot be expanded to any significant degree and which restricts the ball from expanding to any significant extent above its regulation size when inflated above its normal playing pressure. This layer for footballs, volleyballs and soccer balls is referred to as a lining layer and is usually composed of cotton or polyester cloth that is impregnated with a flexible binder resin such as vinyl or latex rubber.

Figure 2:
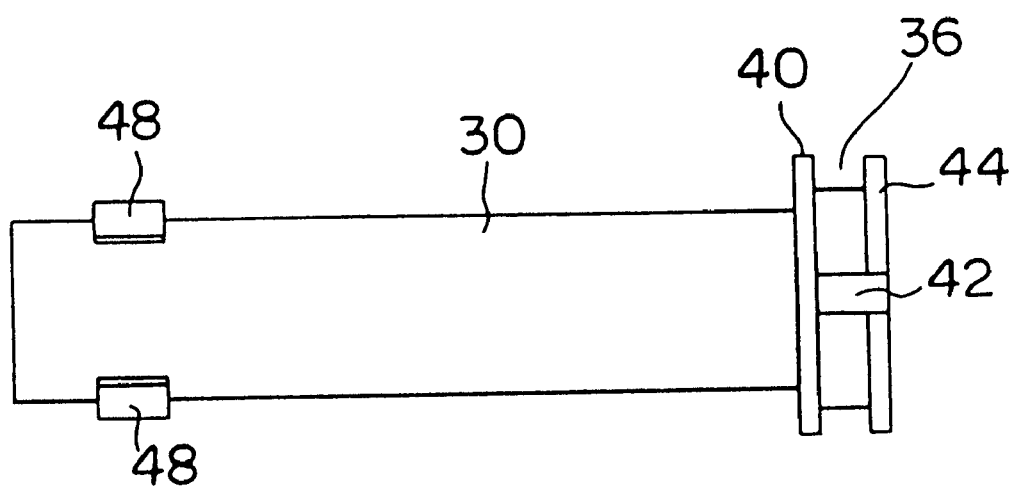
FIG. 2 is a side view of the piston shown in FIG. 1.

Located in the pump cylinder 28 is the pump piston 30 that is illustrated in both FIGS. 1 and 2. The piston includes an annular groove 32 at the bottom end, which contains the spring 34 that forces the piston up in the cylinder 28. Also, at the bottom end of the piston 30 is a circumferential O-ring groove 36 containing an O-ring 38. As seen in FIG. 1, this O-ring groove 36 is dimensioned such that the O-ring 38 can move up and down in the groove 36. The O-ring is forced into the position shown in FIG. 1, when the piston 30 is pushed down. In this position, the O-ring seals between the cylinder wall and the upper flange 40 of the groove 36. As shown in FIG. 2, there are recesses or slots 42 in the groove 36 extending from just below the upper flange 40 down through the lower flange 44. Only one of these slots 42 is shown in FIG. 2 but there are preferably two or more. When the piston 30 is forced up by the spring 34, the O-ring 38 moves to the bottom of the groove 36 which opens up a by-pass around the O-ring through the recesses 42 so that the air can enter the cylinder 28 below the piston 30. Then, when the piston is pushed down, the O-ring moves back up to the top of the groove and seals to force the air out through the cylinder exit nozzle 46.

Figure 3:
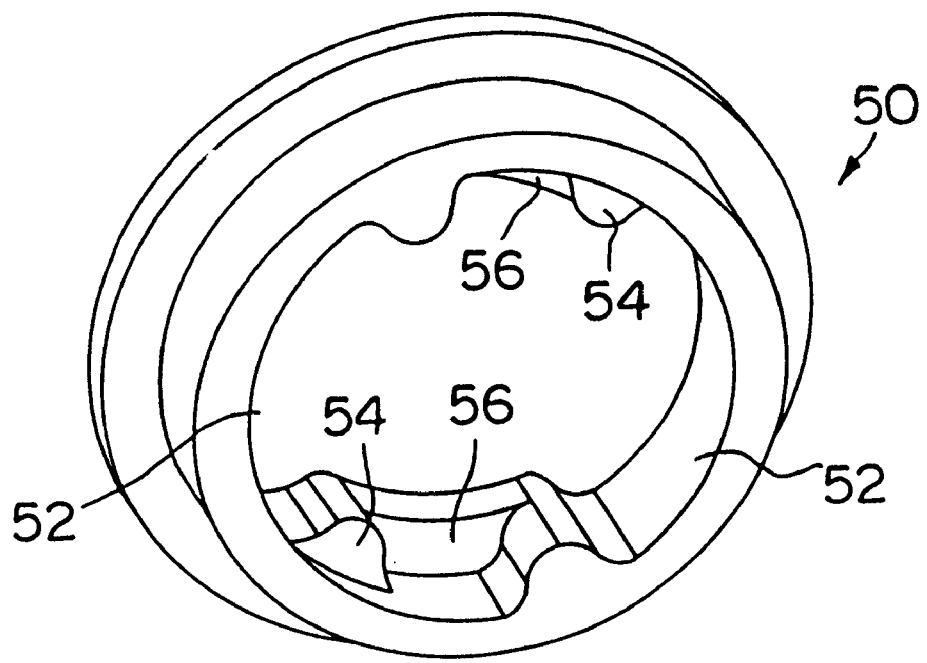
FIG. 3 is an isometric view of the cap for the pump of FIG. 1 showing the configuration for locking and unlocking the pump piston.

At the upper end of the piston are the two flanges 48 which cooperate with a cylinder cap 50 to hold the piston down in the cylinder and to release the piston for pumping. The cylinder cap 50 is fixed into the top of the cylinder 28 and the piston 30 extends through the center of the cylinder cap 50. The cap 50 is cemented into the cylinder 28. FIG. 3 shows an isometric view of the bottom of the cylinder cap 50 and illustrates the open areas 52 on opposite sides of the central opening through which the two flanges 48 on the piston can pass in the unlocked position. In the locked position, the piston is pushed down and rotated such that the two flanges 48 pass under the projections 54 and are rotated into the locking recesses 56. Attached to the upper end of the piston 30 is a button or cap 58 that is designed to essentially completely fill the hole in the carcass and to be flush with the surface of the ball. This button may be of any desired material such as cast urethane or rubber. The cylinder cap 50 provides cushioning to the pump and should also be flexible to match the feel of the rest of the ball. Its surface should be textured to increase grip.

Figure 4:
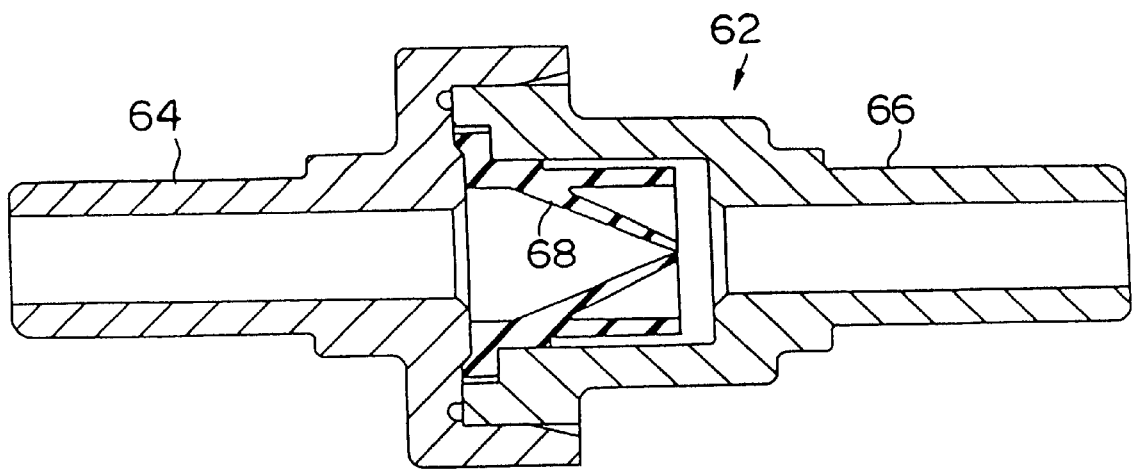
FIG. 4 is a detailed cross-section view of a one-way valve assembly for use on the outlet of the pump of FIG. 1.

FIG. 1 of the drawings shows a pump exit nozzle 46 but does not show the one-way valve that is attached to this exit. Shown in FIG. 4 is a one-way valve assembly 62 of the duckbill-type to be mounted in the exit nozzle 46. This assembly comprises an inlet end piece 64, an outlet end piece 66 and an elastomeric duckbill valve 68 captured between the two end pieces. The end pieces 64 and 66 are preferably plastic, such as a polycarbonate, and may be ultrasonically welded together.

Figure 5:
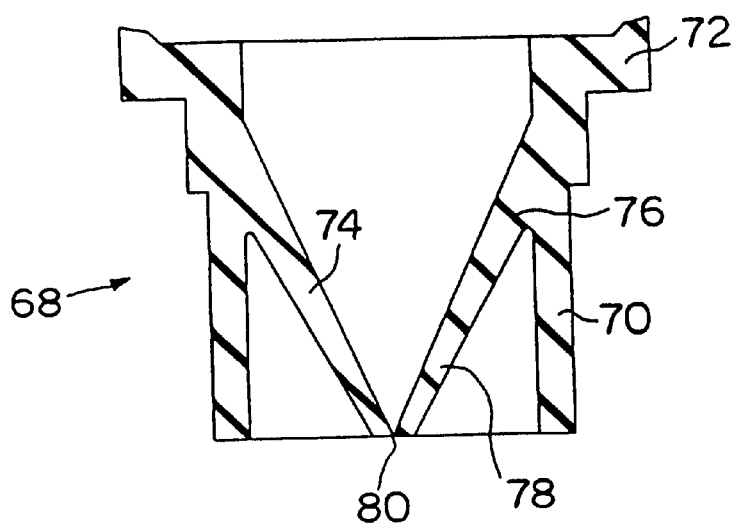
FIG. 5 is a more detailed view of the one-way valve in the FIG. 4 assembly.

Although any desired one-way valve can be used on the exit nozzle 46 and although duckbill valves are a common type of one way valves, a specific duckbill configuration is shown in FIG. 4 and in greater detail in FIG. 5. The duckbill structure 68 is formed of an elastomeric silicone material and is molded with a cylindrical barrel 70 having a flange 72. Inside of the barrel 70 is the duckbill 74 which has an upper inlet end 76 molded around the inside circumference into the barrel 70. The walls or sides 78 of the duckbill 74 then taper down to form the straight-line lower end with the duckbill slit 80. The duckbill functions in the conventional manner where inlet air pressure forces the duckbill slit 80 open to admit air while the air pressure inside of the ball squeezes the duckbill slit closed to prevent the leakage of air. Such a duckbill structure is commercially available from Vernay Laboratories, Inc. of Yellow Springs, Ohio.

Figure 6:
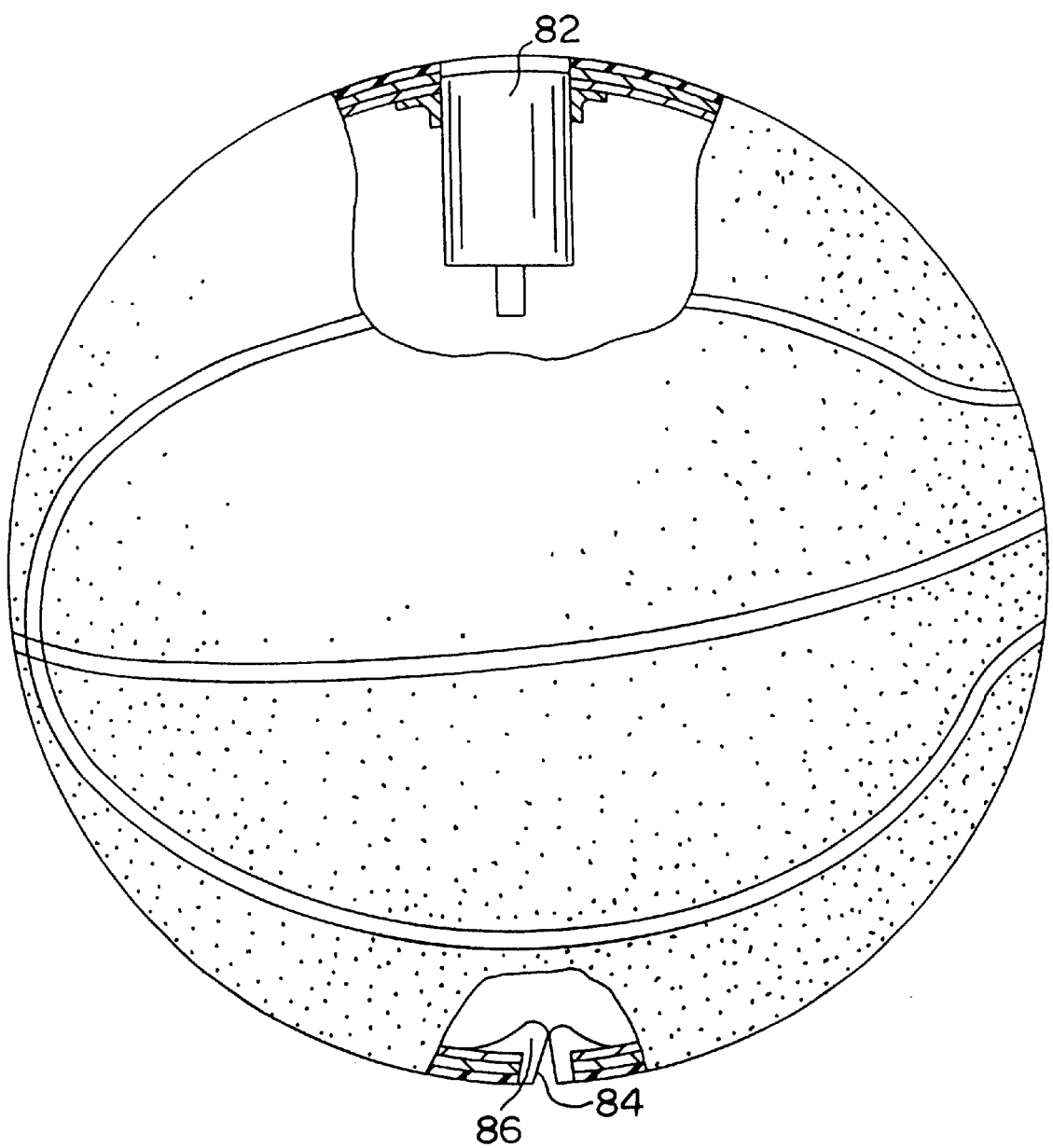
FIG. 6 is a cross-section view of an entire sport ball illustrating a pump on one side and a traditional inflation valve on the opposite side including a counterweight.

A pump assembly of the type described and illustrated in FIGS. 1 to 5 is preferably made primarily from plastics such as high impact polystyrene. Although the assembly is small and light weight, perhaps only about 25 grams, it is desirable that a weight be added to the ball structure to counterbalance the weight of the pump mechanism. FIG. 6 illustrates such an arrangement wherein a pump mechanism generally designated 82 is on one side of the ball and a standard needle valve 84 is on the opposite side of the ball. In this case, the material 86 forming the needle valve 84 is weighted. Additional material can be added to the needle valve housing or the region surrounding the valve. Alternatively, a dense metal powder such as tungsten could be added to the rubber compound. To improve the balance of the ball weights and patches may be added to the bladder at other locations.

Other forms of the invention may utilize different pump constructions and the precise sequence of manufacturing steps may vary in various forms of the invention. Those skilled in the art will recognize the substantial benefits including the economies of construction inherent in allowing the pumping mechanism to be designed to accommodate the environmental considerations inherent in normal use of the sport ball and not the much harsher conditions that are encountered during the manufacturing process.

In the process for manufacturing the sport ball 10, a flat piece of rubber is formed into the shape of the ultimate sport ball 10. In the case of most sport balls this will be spherical, although in other sport balls the shape may be something other than spherical. The method of forming the spherical or other contour from a flat piece of rubber is well known in the art. Thereafter, in the preferred method of manufacture, two diametrically opposed openings are cut in the bladder. For convenience in describing the method of manufacture, reference will be made to a spherical ball. Those skilled in the art will understand that despite the reference to a spherical ball, the method of the present invention may be applied to other sport balls having other shapes such as footballs. In the case of a spherical ball, diametrically opposed openings are dye-cut in the bladder. The method in accordance with the preferred form of the invention requires one of these openings for placement of the pumping apparatus and the other of the openings for placement of the weighted needle valve 84. As noted above, the weighted needle valve 84 provides a counterbalance to the weight of the pumping apparatus that is diametrically opposed to the pumping apparatus in the preferred form of the present sport ball. As described above, the first of these openings has a boot 20 disposed therein. More particularly, the boot 20 is cemented to the bladder in the first opening. Similarly, a standard needle valve 84 is cemented into the diametrically opposed second opening. As described above, the boot 20 has a central bore into which the pumping apparatus is ultimately inserted.

Figure 7:
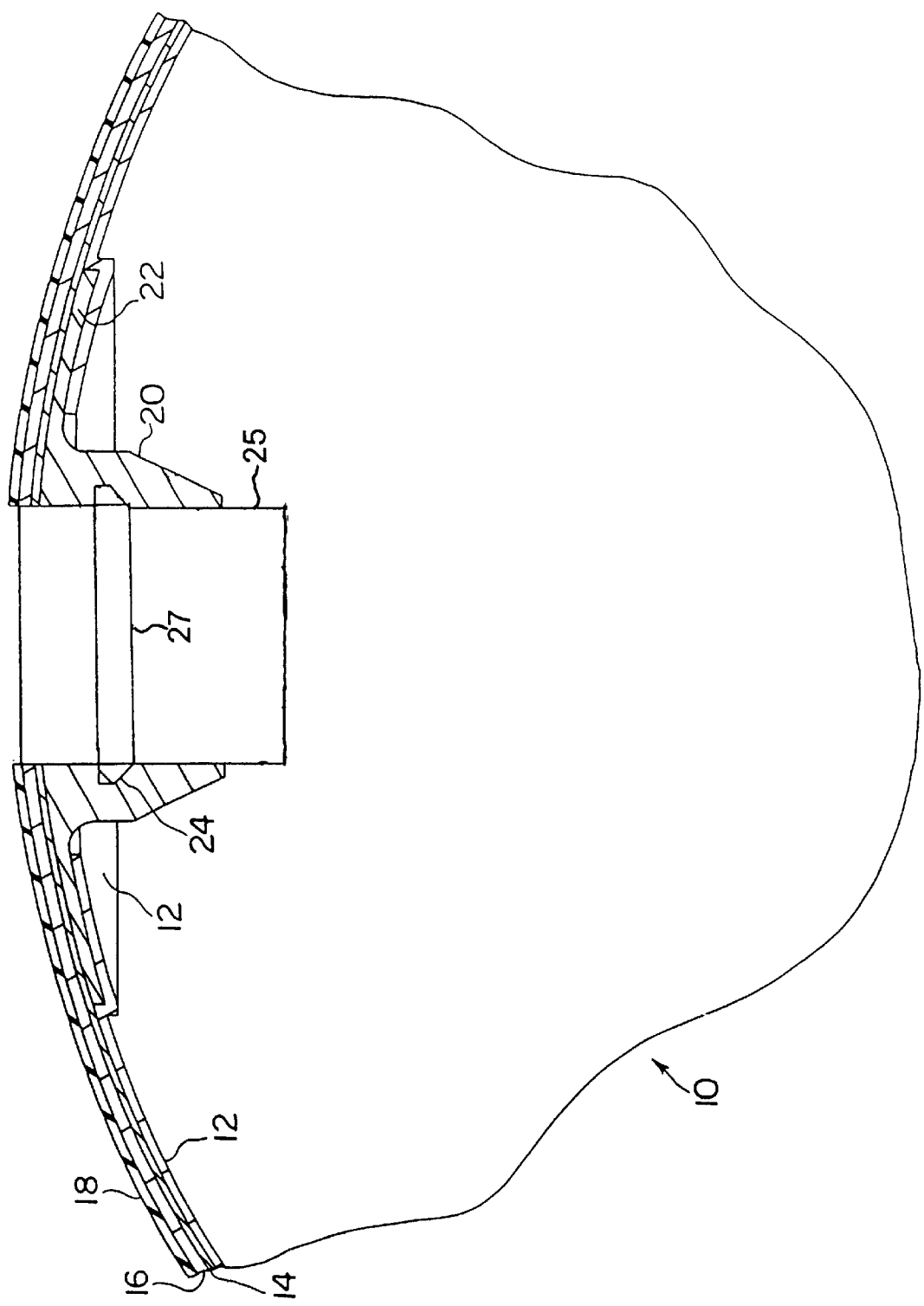
FIG. 7 is a cross-section view similar to FIG. 1 showing a plug positioned in a sport ball.

Before the manufacturing process step that includes depositing layers of reinforcing material over a bladder, the preferred form of the invention includes the step of inserting a molding plug 25 into the central bore of the boot 20, as best seen in FIG. 7. The plug 25 is dimensioned and configured to have a circumferencially extending rib 27 that is dimensioned and configured to have an interfering fit with the groove 24 of the central bore or opening of the boot 20. Obviously, the groove 24 is also dimensioned and configured to engage with an interfering fit with the pump cylinder 28 of the pump apparatus as best shown in FIG. 1.

Incorporated into the carcass of the ball 10 during the formation is a rubber boot or housing 20 with a central opening and with a flange 22 that is bonded to the bladder using a rubber adhesive. The flange 22 of the boot 20 is located between the rubber bladder 12 and the layer of windings 14. A molding plug 25, shown in FIG. 7, is inserted into the boot 20 opening just prior to the molding and winding process. The plug 25 maintains the shape of the central opening of the boot 20 and allows the bladder 12 to be inflated during the manufacturing process. Preferably, the plug 25 is rubber although it may be aluminum, another metal or plastic. The plug 25 is preferably dimensioned and configured for an interference fit between the outer surface of the plug and the central opening of the boot 20. This provides an air tight seal between the plug 25 and the boot 20. In a preferred form of the invention the plug 25 will extend approximately 1⅛ inches into the interior of the ball 10. The upper (as viewed) or opposite axial extremity is preferably dimensioned to be flush with the rubber outer layer 16.

Thus, the plug 25 is installed in the boot 20 prior to the conventional addition of reinforcing windings and a rubber outer layer 16. Thereafter, the bladder 12 is inflated and followed by the addition of reinforcing windings 14 and followed by the addition of a rubber outer layer 16. Similarly, in the case of a aminated ball, the plug 25 is installed in the boot 20 before the addition of an outer layer 18 of leather or synthetic panels that are applied by adhesive and set by cold molding. Those skilled in the art will recognize that the molding process for the butyl rubber bladder is typically at about 300 degrees Fahrenheit and uses a 100 psi internal molding pressure in a process that takes about six minutes. Thereafter, reinforcing windings are wrapped evenly around the outer surface of the bladder 12 until the bladder 12 is embraced by a layer of threads to form a strengthened structure. Before starting the next step the threads that cover the plug 25 are moved away from the plug 25 so that they will not interfere with the later step of removing the plug 25 and inserting a pump 82 or other device. Thereafter, a natural rubber layer 14 is molded onto the structure at a temperature of approximately 300 degrees Fahrenheit with a 100 psi internal molding pressure in a process that takes about six minutes. In the case of some sport balls, the next step is lamination of composite panels onto the ball and setting of the panels by means of a molding process at 120 degrees Fahrenheit with an internal pressure of about 100 psi.

It is only after completion of all of these steps that the molding plug 25 with its circumferential rib 27 engaging the groove 24 of the boot 20 is removed from the boot 20. Typically, the plug 25 is removed from the ball by inserting a slender metal hooked shaped member along the interface between the boot 20 and the plug 25. Thereafter, the hook shape end is engaged with the inner extremity of the plug 25 and the plug is removed. After removal of the plug 25 the pump 82 is inserted into the boot 20. More particularly, the central opening through the boot 20 and particularly the groove 24 cooperates with the flange 26 on the upper end of the pump cylinder 28. The cylinder 28 can optionally be bonded to the boot using any suitable flexible adhesive (epoxy, cyanoacrylate, urethane or other). It will thus be seen that these process steps of installing a plug 25 into the boot 20 during manufacturing steps that require high temperatures followed by removal of the plug 25 and insertion of a pump 82 permits the use of a pump 82 that does not require a design criteria that requires the pump to tolerate the very high temperatures encountered in the ball manufacturing process and thus enables manufacture of a sport ball that can be competitively priced.

Although the method in accordance with the present invention has been described with respect to the molded sport balls those skilled in the art will recognize that the method also has application to stitched sport balls such as stitched footballs, soccer balls and volleyballs. Similarly, although the method has been described with respect to a pump for inflating a sport ball those skilled in the art will recognize that the method has application to installing other devices such as a pressure gauge, a pressure relief valve, or other mechanism into a sport ball. Those skilled in the art will recognize that various other modifications and rearrangements of the parts and process steps may be made without departing from the spirit and scope of the present invention and that the present invention is limited only by the following claims:

What is claimed:

1. A method of manufacturing a sport ball which comprises:

providing a fluid impervious bladder;

providing means for penetrating the bladder that includes means for receiving an object in sealing engagement;

providing a plug dimensioned and configured to engage in sealing relationship said means for receiving;

inserting the plug into the means for receiving;

inflating the bladder;

forming additional layers of material on the bladder that constitutes part of a complete sport ball;

providing a self-contained inflation mechanism dimensioned and configured to be disposed completely within the sport ball and dimensioned and configured to engage the means for receiving;

removing the plug from the means for receiving; and placing the inflation mechanism into the means for receiving.

2. The method as described in claim 1, wherein said step of forming additional layers includes adding reinforcing windings.

3. The method as described in claim 2, wherein said step of forming additional layers includes molding a layer of rubber on the windings.

4. The method as described in claim 3, wherein said step of forming additional layers further includes laminating composite panels onto the ball and setting the panels in a molding process.

5. A method of manufacturing a sport ball which comprises:

provunge a flat piece of rubber;

die-cutting two openings in a flat piece of rubber;

forming said flat piece of rubber into a bladder having the geometric shape of a sport ball with openings disposed in generally opposed relationship;

cementing a needle valve in one of the openings;

cementing a boot in the other of the openings in the rubber;

inserting a plug in the boot that is dimensioned and configured for sealing engagement with the boot;

forming additional layers of material on the bladder; and replacing the plug with a self-contained inflation mechanism dimensioned and configured to be disposed completely within the sport ball and dimensioned and configured to engage the boot.

6. The method as described in claim 5, wherein said step of forming additional layers includes adding reinforcing windings.

7. The method as described in claim 6, wherein said step of forming additional layers includes molding a layer of rubber on the windings.

8. The method as described in claim 7, wherein said step of forming additional layers further includes laminating composite panels onto the ball and setting the panels in a molding process.

9. The method as described in claim 5, wherein the plug extends radially inward beyond the bladder.

10. The method as described in claim 9, wherein the plug does not extend radially outward through all of the layers of the sport ball.

* * * * *